(12) United States Patent
Datta Gupta et al.

(10) Patent No.: US 11,453,302 B2
(45) Date of Patent: Sep. 27, 2022

(54) HARVESTING ELECTRICAL ENERGY FROM AN RF SIGNAL IN A VEHICLE

(71) Applicant: Ford Global Technologies, LLC, Dearborn, MI (US)

(72) Inventors: Somak Datta Gupta, Novi, MI (US); Brian Bennie, Sterling Heights, MI (US); Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 16/945,649

(22) Filed: Jul. 31, 2020

(65) Prior Publication Data

US 2022/0032801 A1    Feb. 3, 2022

(51) Int. Cl.
| | | |
|---|---|---|
| *B60L 53/36* | (2019.01) | |
| *H04B 17/318* | (2015.01) | |
| *G08G 1/14* | (2006.01) | |
| *H04W 4/40* | (2018.01) | |
| *H02J 50/20* | (2016.01) | |

(Continued)

(52) U.S. Cl.
CPC ............ *B60L 53/36* (2019.02); *G08G 1/14* (2013.01); *H02J 50/001* (2020.01); *H02J 50/20* (2016.02); *H04B 17/318* (2015.01); *H04W 4/40* (2018.02); *H04W 84/12* (2013.01)

(58) Field of Classification Search
CPC ........ B60L 53/36; H04B 17/318; H02J 50/20; H02J 50/001; H04W 4/40; H04W 84/12; G08G 1/14
See application file for complete search history.

(56) References Cited

U.S. PATENT DOCUMENTS 9,679,490 B2    6/2017  Ceribelli et al.
9,845,050 B1 *  12/2017  Garza .................... H04W 4/38
(Continued)

FOREIGN PATENT DOCUMENTS

AU    2018100012 A4 *  2/2018
CN       104658307 A  *  5/2015  ............... G08G 1/14

OTHER PUBLICATIONS

A.A. Alkheir et al. "RF—Energy Harvesting From Moving Vehicles: Mathematical Modeling and Selection Protocol" IEEE Confs. (Aug. 2018) pp. 274-279.

(Continued)

*Primary Examiner* — Chico A Foxx
(74) *Attorney, Agent, or Firm* — Frank Lollo; Eversheds Sutherland (US) LLP (57) ABSTRACT

This disclosure is generally directed to harvesting electrical energy from RF signals that may be present in a vehicle. The RF signals may include cellular signals and Wi-Fi signals, for example. In an example system, an RF signal strength evaluator may be used to evaluate the RF signals in order to identify a strongest RF signal or a strongest band of RF signals that can be harvested to obtain electrical energy. An RF-to-electrical energy converter converts the RF signals(s) to electrical energy, which can be stored in an energy storage element. The energy storage element can be coupled to a device charger for charging various types of devices in the vehicle. In some instances, the system can be used to generate an ambient RF energy map that may be used by one or more vehicles to identify an optimal spot to park for harvesting RF signals.

15 Claims, 6 Drawing Sheets

(51) Int. Cl.
*H02J 50/00* (2016.01)
*H04W 84/12* (2009.01)

(56) References Cited

U.S. PATENT DOCUMENTS

| | | | | |
|---|---|---|---|---|
| 10,033,424 | B2* | 7/2018 | Gollakota | H04B 1/40 |
| 10,587,150 | B1* | 3/2020 | Elangovan | G06K 7/10297 |
| 2005/0061568 | A1* | 3/2005 | Schondorf | B60R 22/48 |
| | | | | 280/801.1 |
| 2008/0252432 | A1* | 10/2008 | Hein | G08C 17/02 |
| | | | | 429/162 |
| 2011/0115605 | A1* | 5/2011 | Dimig | H02J 7/025 |
| | | | | 340/5.61 |
| 2011/0309686 | A1* | 12/2011 | Scherbenski | H02J 50/20 |
| | | | | 307/104 |
| 2013/0214732 | A1* | 8/2013 | Nowottnick | H02J 50/80 |
| | | | | 320/108 |
| 2018/0337563 | A1* | 11/2018 | Logan | H02J 50/20 |
| 2022/0037930 | A1* | 2/2022 | Sounas | H02J 50/23 |

OTHER PUBLICATIONS

S.S. Murugan et al. "Design and Prototype Implementation of an Automatic Energy Harvesting System for Low Power Devices From Vibration of Vehicles" (Dec. 2015).

R. Atallah et al. "Energy Harvesting in Vehicular Networks: A Contemporary Survey" IEEE Wireless Communications (Apr. 2016) pp. 70-77.

* cited by examiner

FIG. 6

HARVESTING ELECTRICAL ENERGY FROM AN RF SIGNAL IN A VEHICLE

BACKGROUND

Modern vehicles typically include a large number of electrical devices that draw power from an onboard battery. It is desirable, where feasible, to minimize the amount of power drawn from the battery by these devices. One way to do so is to place at least some devices in a power-down condition when not in use. Various other battery-powered electrical devices may be carried into a vehicle by a driver of the vehicle, such as a remote-operations key fob or a smartphone. It is desirable to conserve power in such devices as well. This operation may be carried out by placing these devices in a power-down condition as well. For example, the remote-operations key fob, which may be used to start an engine of a vehicle and/or to unlock a door of the vehicle, may be placed in a power-down mode when the remote-operations key fob is located far from the vehicle.

Regardless of their nature or functionality, and regardless of being a part of a vehicle or being carried into the vehicle, such devices typically have a wake-up circuit that is constantly in a powered-up state in order to detect an operation related to use of the device. For example, the remote-operations key fob may include a wake-up circuit that remains powered-up all the time in order to communicate with a transceiver in a vehicle. When the remote-operations key fob is moved close to the vehicle (when the driver approaches the vehicle, for example) a transceiver in the wake-up circuit communicates with the transceiver in the vehicle and wakes up other circuits in the remote-operations key fob, such as, for example, the remote engine-start circuit. Even though the amount of power drawn by such a wake-up circuit is small, it may be enough to adversely impact a battery life of a battery in the key fob.

It may therefore be desirable to provide a way to charge a battery in any device in a vehicle, whether the device is a part of the vehicle or is carried into the vehicle.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for harvesting electrical energy from RF signals that may be present in a vehicle. The RF signals may include cellular signals and Wi-Fi signals, for example. In one example, an RF signal strength evaluator may be used to evaluate the RF signals in order to identify a strongest RF signal or a strongest band of RF signals that can be harvested to obtain electrical energy. An RF-to-electrical energy converter converts the RF signals(s) to electrical energy, which can be stored in an energy storage element. The energy storage element can be coupled to a device charger for charging various types of devices in the vehicle. In some instances, the system can generate an ambient RF energy map that may be used by one or more vehicles to identify an optimal spot for harvesting RF signals.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "an RF signal" as used herein pertains to any wireless signal of any frequency (UHF, VHF, microwave etc.) and can denote a single RF frequency or a band of frequencies in a wideband RF frequency spectrum. The phrase "an RF frequency" not only applies to a single frequency but may be equally applicable to "a band of RF frequencies." The phrase "electrical energy" as used herein represents any of various forms of electricity (current, voltage, power) that can be used to charge an energy storage element. For example, in one case, the "electrical energy" can be an electrical current that is generated by an RF-to-electrical energy converter and coupled into an energy storage element such as a battery or capacitor. In another case, the "electrical energy" can be an electrical "charge" that is generated by an RF-to-electrical energy converter and coupled into an energy storage element such as a capacitor. The word "vehicle" as used herein encompasses various types of vehicles such as cars, trucks, vans, and sports utility vehicles (SUVs), and also encompasses various types of automobiles such as a boat, a tractor, or a recreational vehicle (RV). It should be understood that the word "example" as used herein is intended to be non-exclusionary and non-limiting in nature.

Figure 1:
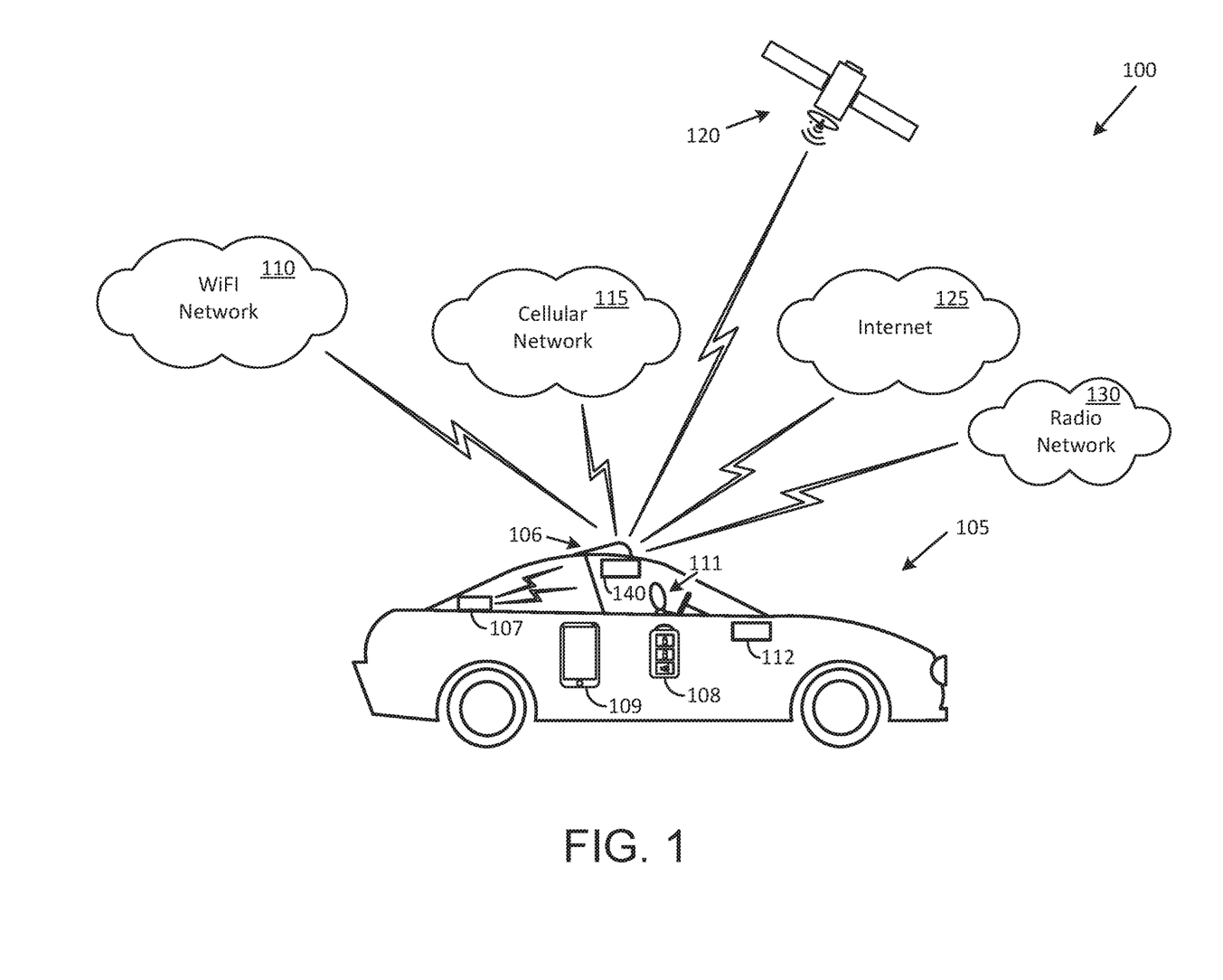
FIG. 1 illustrates an example RF signal harvesting system for harvesting electrical energy in a vehicle in accordance with the disclosure.

FIG. 1 illustrates an example RF signal harvesting system 100 for harvesting electrical energy in a vehicle 105 in accordance with the disclosure. The vehicle 105 may be any of various types of vehicles that include components such as an antenna 106 and an RF signal harvesting apparatus 140. In at least some cases, the vehicle 105 may further include a Wi-Fi apparatus 107 and a component 112 having a rechargeable battery. The component 112 can be a communication apparatus in some cases.

Other components may be carried into the vehicle 105 by a driver 111 and/or passengers of the vehicle 105. Some example components that may be carried into the vehicle 105 include a remote-operations key fob 108 and a smartphone 109. Such components can include a rechargeable battery that can be charged by the RF signal harvesting apparatus 140 in accordance with the disclosure.

The antenna 106 can be a single antenna or an array of antennas configured to receive various types of wireless signals. A few examples of RF signals that may be received by the antenna 106 include Wi-Fi signals from a Wi-Fi network 110, cellular signals from a cellular network 115, satellite signals from a satellite system 120, data signals from the Internet 125, and broadcast signals from a radio network 130.

The Wi-Fi signals can, for example, be signals transmitted from an Internet-of-Things (IoT) device or another vehicle. The signals may be transmitted by using a communication protocol such as, for example, an infrastructure-to-vehicle protocol (I2V) protocol, a vehicle-to-everything (V2X) protocol, a Wi-Fi protocol, a Bluetooth® protocol, or any machine-to-machine protocol. The cellular signals can, for example, be cellular communication signals such as 3G, 4G, or 5G signals provided by a cellular communication system or a cellular communication apparatus using communication protocols such as Global System for Mobile Communications (GSM), Universal Mobile Telecommunications Service (UMTS), Code Division Multiple Access (CDMA), Long-Term Evolution (LTE), and 5G New Radio (NR). The satellite signals can be, for example, global positioning satellite (GPS) signals. The data signals can, for example, be carrying world-wide-web (www) content using various protocols such as transmission control protocol/Internet protocol (TCP/IP). The broadcast signals can, for example, be radio signals (AM and FM radio).

The antenna 106 is typically connected via wiring provided in the vehicle 105 to one or more components in the vehicle 105. For example, when the antenna 106 is an array of antennas, a first antenna that is tuned to receive a Wi-Fi signal may be connected to the Wi-Fi apparatus 107 in the vehicle 105, a second antenna that is tuned to a broadcast frequency may be connected to a radio (not shown) in the vehicle 105, a third antenna that is tuned to the GPS satellite system 120 may be connected to a GPS device (not shown) in the vehicle 105, a fourth antenna that is tuned to a cellular band of frequencies may be connected to a Bluetooth®-enabled device that allows the driver 111 to make hands-free phone calls.

The antenna 106 may also be connected to the RF signal harvesting apparatus 140 via wiring provided in the vehicle 105. The wiring may be the same wiring as used for the purposes described above (Wi-Fi apparatus 107, radio, GPS system etc.) or may be wiring that is expressly provided for the purpose of RF signal harvesting. In one implementation, the RF signal harvesting apparatus 140 is mounted close to the antenna 106 so as to minimize RF signal loss and maximize the amount of electrical energy obtained by RF signal harvesting. If mounted at a distance from the antenna 106, an RF signal booster circuit may be included in the RF signal harvesting apparatus 140 for increasing an amplitude of an RF signal.

Figure 2:
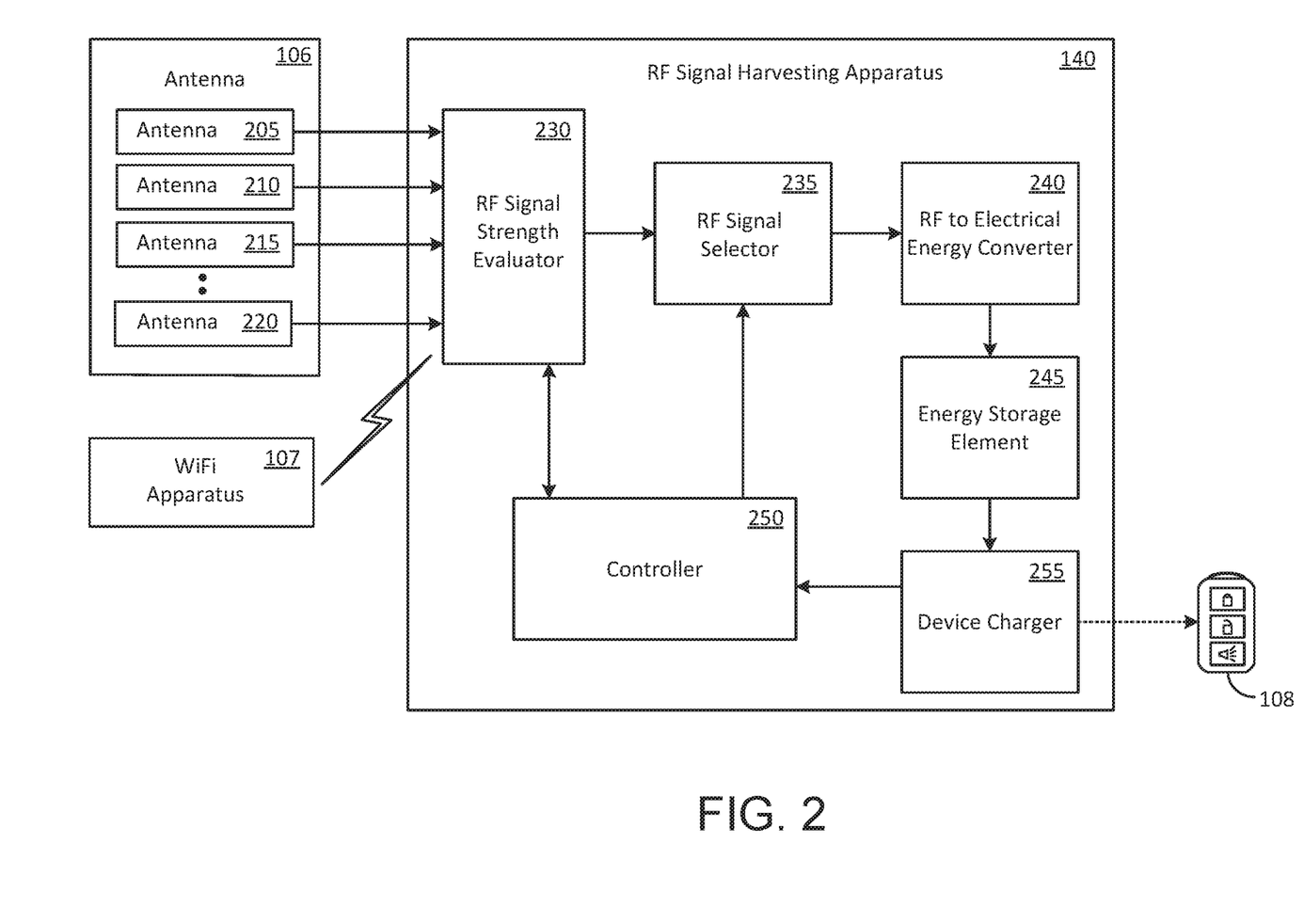
FIG. 2 illustrates some example functional blocks of an RF signal harvesting system in accordance with an embodiment of the disclosure.

FIG. 2 illustrates some example functional blocks of the RF signal harvesting apparatus 140 in accordance with an embodiment of the disclosure. The antenna 106 that is described above may be connected to the RF signal harvesting apparatus 140 for providing the RF signals that are to be harvested for obtaining electrical energy. In one implementation, the antenna 106 may be tuned to any RF signal such as the ones described above. In another implementation, the antenna 106 may be tuned to an RF signal that has been specifically tailored for the purpose of supporting electrical energy harvesting.

In the configuration illustrated in FIG. 2, the antenna 106 includes "n" antennas ($n \geq 2$). The "n" antennas can include, for example, an antenna 205 that is tuned to RF signals received from the Wi-Fi network 110, an antenna 210 that is tuned to RF signals received from the cellular network 115, an antenna 215 that is tuned to RF signals received from the Internet 125, an antenna 220 that is tuned to receive an RF signal that is specifically broadcasted by a transmission source (not shown) for electrical energy harvesting purposes, and so on.

The RF signal harvesting apparatus 140 can further include an RF signal strength evaluator 230 that evaluates the "n" RF signals received from the antenna 106 to identify one or more RF signals that may be suitable for harvesting. The one or more RF signals can contain a single frequency or a band of RF frequencies. Identifying an RF signal suitable for harvesting may be carried out in various ways. In one example case, the RF signal harvesting apparatus 140 may identify an RF signal on the basis of signal strength. In another example case, the RF signal harvesting apparatus 140 may identify an RF signal on the basis of conversion efficiency associated with converting RF energy to electrical energy. In some applications, the RF signal strength evaluator 230 may evaluate Wi-Fi signals provided by the Wi-Fi apparatus 107 independently, or in combination with the "n" RF signals received from the antenna 106.

The operations performed by the RF signal strength evaluator 230 may be carried out in cooperation with a controller 250. In one case, the controller 250 may execute an algorithm to identify one or more RF signals that may be suitable for harvesting. The algorithm may involve the use of equations such as, for example:

$$E \text{ total energy harvested} = \max \Sigma_1^n (Ef1 + Ef2 + Ef3 + \ldots Efn) \tag{1}$$

where f1, f2, f3 . . . fn are frequencies of the RF signals provided to the RF signal harvesting apparatus 140 by the antenna 106 or $$E \text{ total energy harvested} = \max \Sigma_1^n (Eb1+Eb2+Eb3+ \ldots Ebn) \quad (2)$$

where b1, b2, b3 . . . bn are frequency bands of the RF signals provided to the RF signal harvesting apparatus 140 by the antenna 106.

The frequency bands can include, for example, 600 MHz to 3.5 GHz frequency bands and mm Wave bands (24 GHz to 100 GHz) used for cellular phone applications and certain Wi-Fi applications (GSM, UMTS, LTE), and/or 5.8 GHz to 5.9 GHz bands used for some other Wi-Fi applications.

The controller 250 may also provide a control signal to an RF signal selector 235 based on the evaluation carried out in cooperation with the RF signal strength evaluator 230. The control signal may specify to the RF signal selector 235 one or more RF frequencies that are to be selected and routed to an RF-to-electrical energy converter 240. The information provided by the controller 250 to the RF signal selector 235 may also be transmitted by the controller 250 to a cloud storage element for use by other vehicles.

The RF-to-electrical energy converter 240, which harvests electrical energy from the RF signals, can include components such as, for example a Powerharvester® receiver and a Powerharvester® RF-to-DC converter module manufactured by Powercast® Corporation. The RF-to-electrical energy converter 240 can be an RF-to-DC converter that produces a DC current from an RF signal. The output of the RF-to-electrical energy converter 240 is fed into an energy storage element 245. Various components such as rechargeable batteries, trickle-charge batteries, and capacitors, may be incorporated into the energy storage element 245. The energy storage element 245 may be coupled to a device charger 255 that can be used for charging a component that may be a part of the vehicle 105 (such as the component 112) or may be carried into the vehicle 105 (such as the remote-operations key fob 108 or the smartphone 109). The device charger 255 may include voltage conditioning circuitry, such as for example, a DC voltage boost circuit or a DC-to-DC voltage converter for producing a DC voltage having a voltage level and current capability to charge a device such as the remote-operations key fob 108, the smartphone 109, or the component 112.

Figure 3:
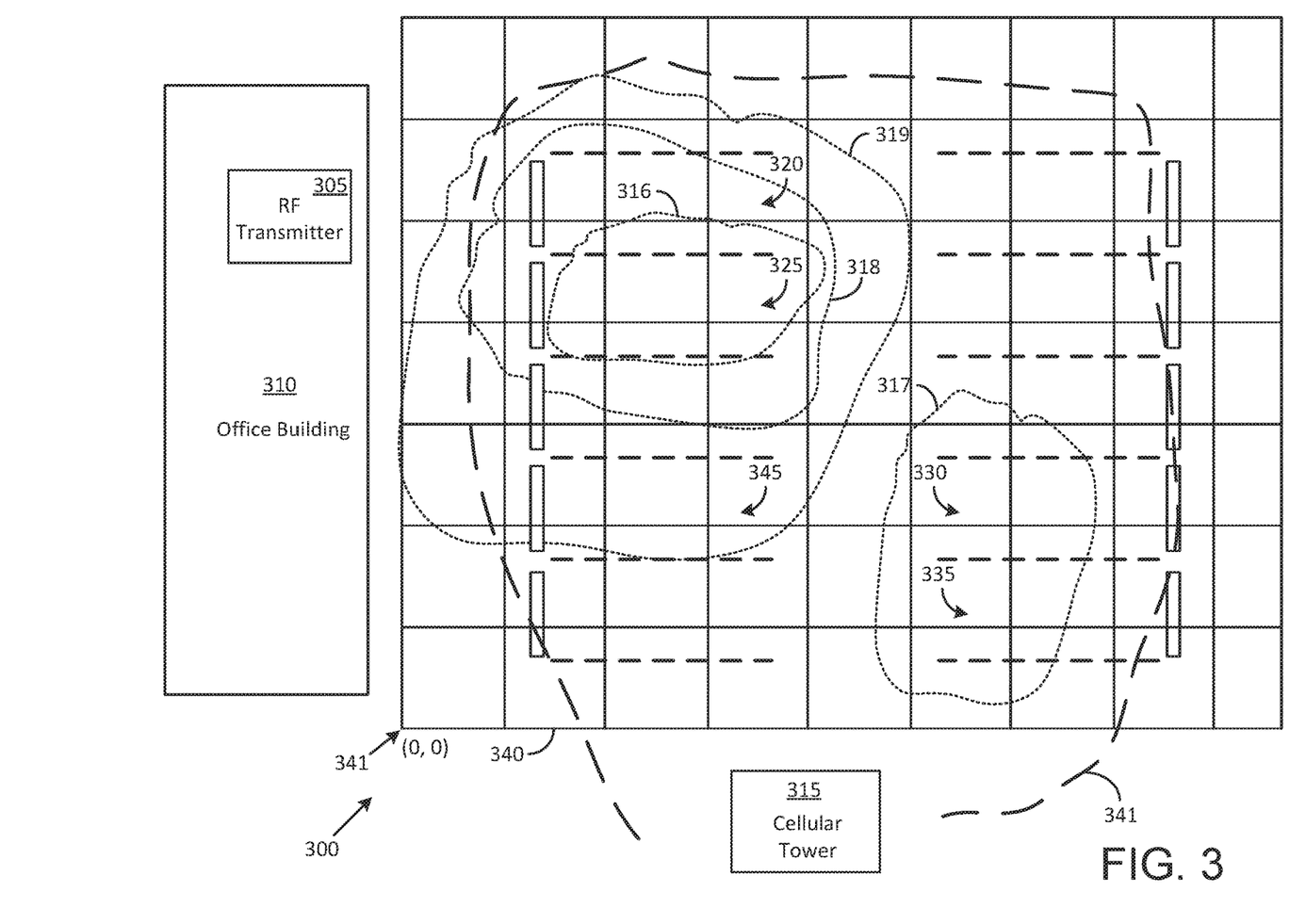
FIG. 3 illustrates an example ambient RF energy map in accordance with an embodiment of the disclosure.

FIG. 3 illustrates an example ambient RF energy map 300 in accordance with an embodiment of the disclosure. The ambient RF energy map 300 can provide RF energy information about any location or area in which the vehicle 105 can be parked. In this example, the ambient RF energy map 300 provides RF energy information pertaining to a parking lot. The RF energy present in the parking lot is primarily contributed by a cellular tower 315 located near the parking lot and an RF transmitter 305 located in an office building 310 near the parking lot. A dashed line 341 indicates a radiation pattern of the cellular tower 315 over the parking lot. In this example, the RF energy radiated by the cellular tower 315 is substantially uniform over the parking lot.

Transmission of RF signals from the RF transmitter 305 generate two hotspots, which may, or may not, have the same level of RF energy. The first hotspot, which is indicated by a dashed line 317, provides maximum RF energy to the antenna 106 of the vehicle 105 when the vehicle 105 is parked in either a parking spot 330 or an adjacent parking spot 335. The second hotspot, which is indicated by a dashed line 316, provides maximum RF energy to the antenna 106 of the vehicle 105 when the vehicle 105 is parked in a parking spot 325. The level of RF energy present in an adjacent parking spot 320 (RF energy level indicated by a dashed line 318) is lower than the RF energy present at the parking spot 325. The level of RF energy present in another parking spot 345 (RF energy level indicated by a dashed line 319) is lower than the RF energy present at the parking spot 320.

The ambient RF energy map 300 provides information about the various levels of RF energy contributed by the various RF signal sources, such as the RF transmitter 305 and the cellular tower 315, at various locations in the parking lot. The information may be stored in a database of the RF signal harvesting apparatus 140 and may be used by the RF signal harvesting apparatus 140 to guide the driver 111 to an optimal parking spot available for the vehicle 105 in the parking lot. In one example scenario, the parking spot 330 may be occupied but the parking spot 335 may be available for parking. The RF signal harvesting apparatus 140 may refer to the ambient RF energy map 300 stored in the database and provide instructions via, for example, an infotainment system in the vehicle 105 to guide the driver 111 to park in the parking spot 335 (rather than other parking spots in the parking lot). The RF signal strength evaluator 230 (shown in FIG. 2) may then evaluate the RF energy levels provided by the RF transmitter 305 and the cellular tower 315 at the parking spot 335 to identify which of the two RF signals to use for harvesting electrical energy. If both the parking spot 330 and the parking spot 335, the RF signal harvesting apparatus 140 may guide the driver to an available parking spot in the parking lot and evaluate the RF energy levels provided by the RF transmitter 305 and the cellular tower 315 at the other parking spot.

The ambient RF energy map 300 can be implemented in various ways. In one implementation, the ambient RF energy map 300 may be provided in the form of a grid map 340 having (0,0) coordinates corresponding to any suitable location in the parking lot. In another implementation, the ambient RF energy map 300 may be provided in the form of GPS coordinates. Each of the parking spots in the parking lot may be identified on the basis of the GPS coordinates.

Figure 4:
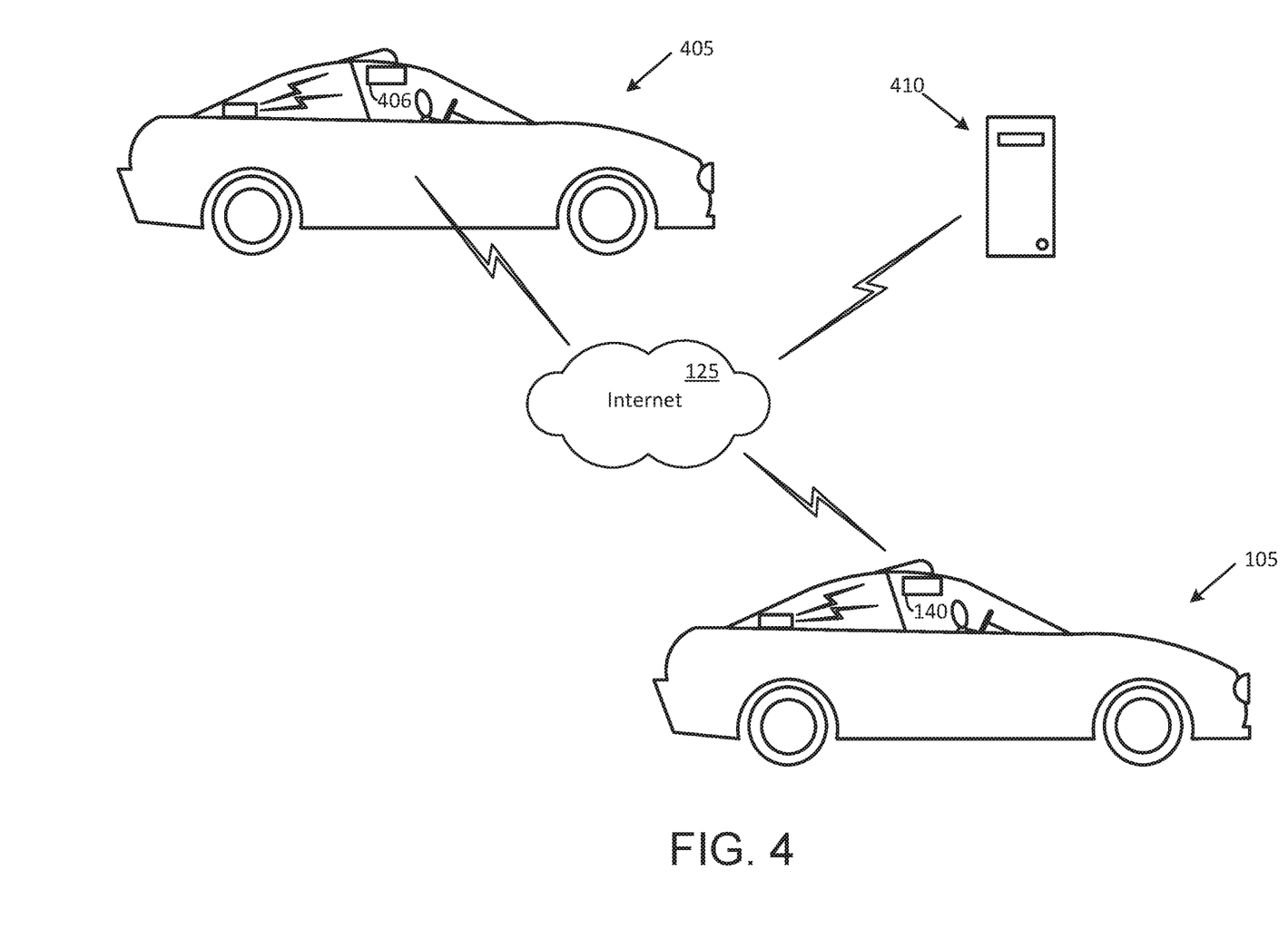
FIG. 4 illustrates an example scenario for equipping a vehicle with an ambient RF energy map in accordance with an embodiment of the disclosure.

FIG. 4 illustrates an example scenario for equipping the vehicle 105 with the ambient RF energy map 300 in accordance with an embodiment of the disclosure. In a first example scenario, the ambient RF energy map 300 is stored in a server computer 410. The RF signal harvesting apparatus 140 may transmit a request to the server computer 410 via the Internet 125. The server computer 410 may respond to the request by transmitting the ambient RF energy map 300 to the RF signal harvesting apparatus 140.

In a second example scenario, the ambient RF energy map 300 is stored in a database of a RF signal harvesting apparatus 406 of another vehicle 405. The RF signal harvesting apparatus 140 may transmit a request to the RF signal harvesting apparatus 406 via the Internet 125. The RF signal harvesting apparatus 406 may respond to the request by transmitting the ambient RF energy map 300 to the RF signal harvesting apparatus 140.

Figure 5:
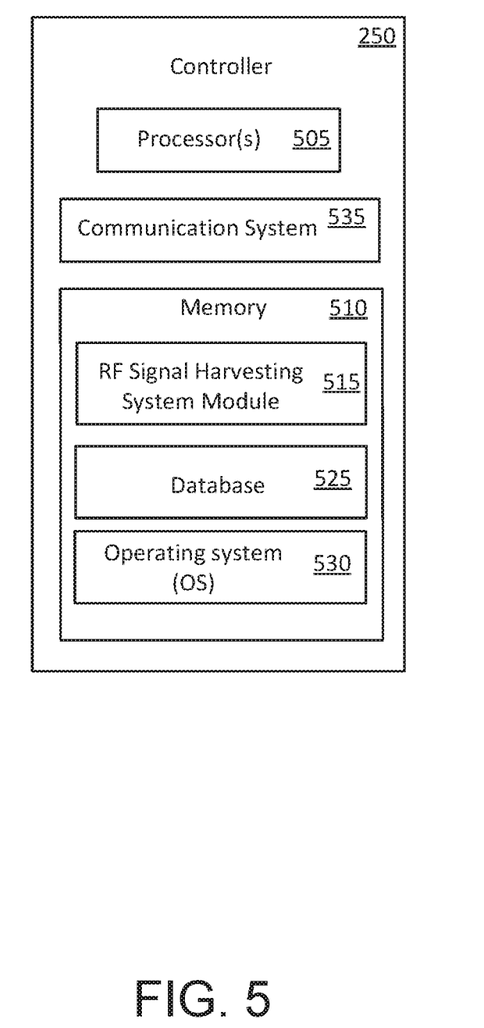
FIG. 5 shows some example components that can be included in a controller of an RF signal harvesting system in accordance with an embodiment of the disclosure.

FIG. 5 shows some example components that can be included in the controller 250 of the RF signal harvesting apparatus 140 in accordance with an embodiment of the disclosure. The controller 250 may include a processor 505, a communication system 535, and a memory 510. The communication system 535 can include a wireless transceiver that allows the controller 250 to communicate with various devices such as, for example, the server computer 410 and/or another RF signal harvesting system located in another vehicle. The communications may be directed, for example, at obtaining the ambient RF energy map 300.

The wireless transceiver may use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with various devices. The wireless transceiver may use any of various communication formats such as, for example, a vehicle-to-everything (V2X) communication format, an Internet communications format, or a cellular communications format for communicating with the server computer 410 and/or another RF signal harvesting system located in another vehicle.

The memory 510, which is one example of a non-transitory computer-readable medium, may be used to store an operating system (OS) 530, a database 525, and code modules such as an RF signal harvesting system module 515. The code modules are provided in the form of computer-executable instructions that can be executed by the processor 505 for performing various operations in accordance with the disclosure. The database 525 may be used to store various items such as, for example, the ambient RF energy map 300.

Figure 6:
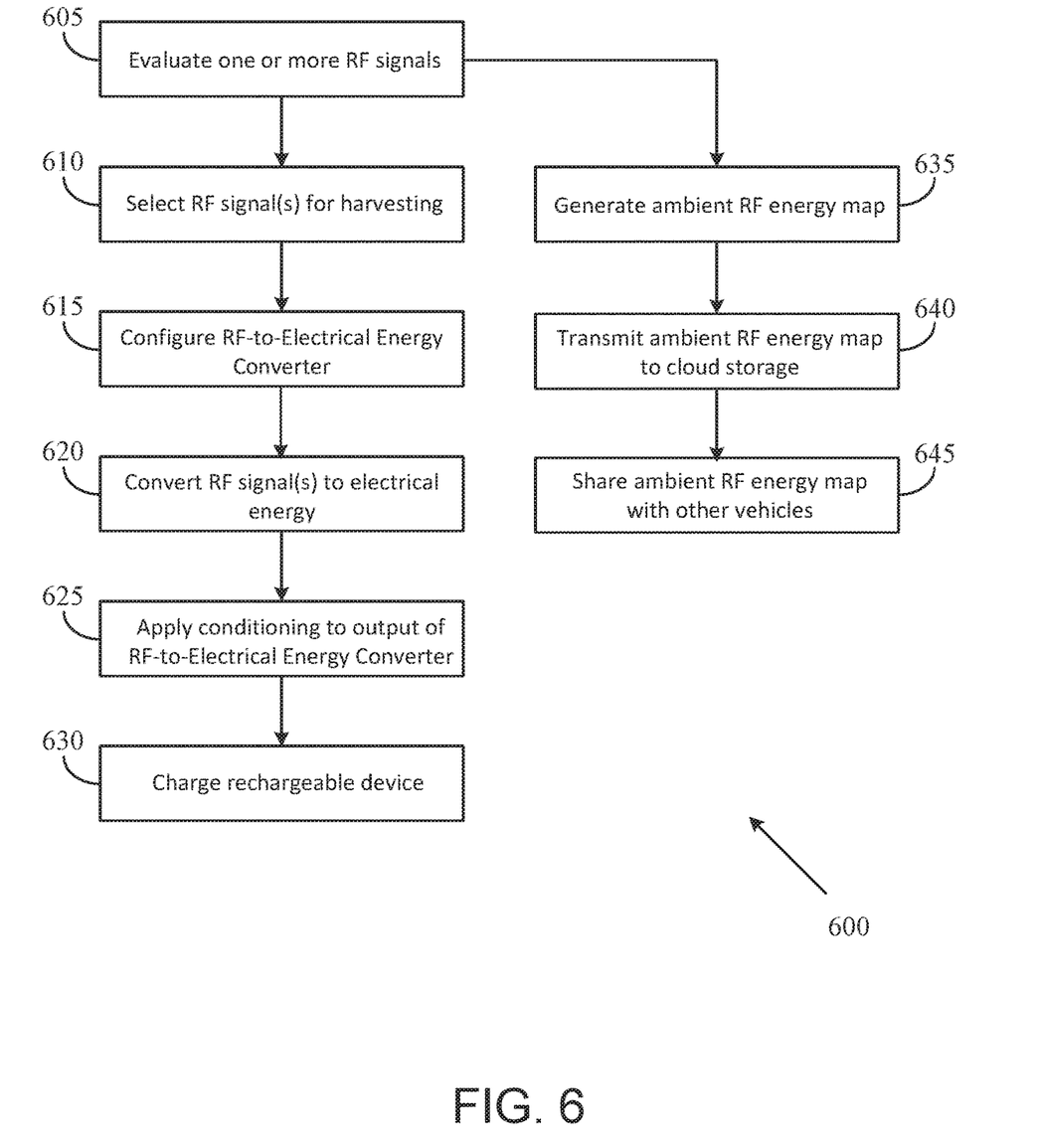
FIG. 6 shows an example flowchart of a method to harvest an RF signal in a vehicle in accordance with an embodiment of the disclosure.

FIG. 6 shows an example flowchart 600 of a method to harvest an RF signal in the vehicle 105 in accordance with an embodiment of the disclosure. The flowchart 600 illustrates a sequence of operations that can be implemented in hardware, software, or a combination thereof. In the context of software, the operations represent computer-executable instructions stored on one or more non-transitory computer-readable media such as the memory 510, which, when executed by one or more processors such as the processor 505 perform the recited operations. More particularly, some or all of the computer-executable instructions can be embodied in the form of the RF signal harvesting system module 515 in the controller 250.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The various objects that are included in FIGS. 1 through 5 are used below for purposes of description. However, it must be understood that the description is equally applicable to other objects in various other embodiments. Also, various statements made with respect to a frequency are equally applicable to a band of frequencies. Similarly, various statements made with respect to an RF signal are equally applicable to multiple RF signals.

At block 605, one or more RF signals are evaluated by the RF signal strength evaluator 230. The RF signals are received in the antenna 106 of the vehicle 105. In one example case, the evaluation may include identifying an RF signal(s) on the basis of signal strength. The signal strength may be assessed on the basis of an amount of DC current desired for charging one or more devices such as the remote-operations key fob 108, the smartphone 109, or the component 112. In another example case, the evaluation may include identifying an RF signal(s) having a desired frequency or a band of frequencies. In yet another example case, the evaluation may include identifying an RF signal(s) on the basis of a conversion efficiency of the RF-to-electrical energy converter 240.

At block 610, one or more RF signals are selected based on the evaluation of the various RF signals. The selection may be carried out by the RF signal selector 235.

At block 615, the RF-to-electrical energy converter 240 is configured to perform RF-to-electrical energy conversion. For example, one or more components of a charging circuit and/or a discharging circuit in the RF-to-electrical energy converter 240 (resistors, capacitors, etc.) may be configured based on a power level of the RF signals(s).

At block 620, the RF signal(s) selected by the RF signal selector 235 is converted to electrical energy, such as, for example, a DC electrical current. The conversion may be carried out by the RF-to-electrical energy converter 240.

At block 625, the output of the RF-to-electrical energy converter 240 may be conditioned. The conditioning, which may be carried out in the device charger 255, can include, for example, a DC voltage boost to increase a voltage level, and/or a DC-to-DC voltage conversion for changing a voltage level.

At block 630, the electrical energy (DC current or DC voltage, for example) may be used to charge a device, such as, for example, the remote-operations key fob 108, the smartphone 109, or the component 112.

In some instances, at block 635, an ambient RF energy map may be generated based on the operations performed by the RF signal strength evaluator 230 and/or the RF signal selector 235. At block 640, the ambient RF energy map may be transmitted to a storage element such as the server computer 410 or a cloud storage component. At block 645, the ambient RF energy map may be shared with other vehicles.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 510, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
receiving, in a vehicle, a radio-frequency (RF) signal;
obtaining electrical energy from at least a portion of the RF signal;
storing the electrical energy in an energy storage element; and
providing, based on the stored electrical energy, power to a device from the energy storage element,
wherein receiving the RF signal comprises:

determining a first signal strength of the RF signal at a first location where the vehicle is parked;
determining a second signal strength of the RF signal at a second location where the vehicle is parked;
comparing the first signal strength to the second signal strength to determine a greater signal strength; and
parking the vehicle in one of the first location or the second location based on the greater signal strength.

2. The method of claim 1, wherein obtaining electrical energy from at least the portion of the RF signal comprises:
identifying one of a frequency component or a frequency band in the RF signal; and
configuring an antenna to obtain electrical energy from the one of the frequency component or the frequency band.

3. The method of claim 1, wherein obtaining electrical energy from at least the portion of the RF signal comprises:
identifying a frequency band in a wideband frequency spectrum;
selecting a first antenna in the vehicle, the first antenna tuned to operate in the frequency band; and
coupling the energy storage element to the first antenna for obtaining electrical energy in the frequency band.

4. The method of claim 3, wherein the frequency band is an operating frequency band of a communication apparatus in the vehicle.

5. The method of claim 4, wherein the communication apparatus is one of a cellular communication apparatus or a Wi-Fi apparatus.

6. A method comprising:
detecting, in a first vehicle, a first radio-frequency (RF) signal;
harvesting electrical energy from the first RF signal;
providing power to a device in the first vehicle based on the electrical energy obtained from the first RF signal;
determining, based on an ambient RF energy map and a signal strength of the first RF signal at various parking spots, a parking spot for the first vehicle; and
obtaining the ambient RF energy map from one of a second vehicle or a cloud storage element.

7. The method of claim 6, wherein the first RF signal is received from a first transmitting element located outside the first vehicle, the method further comprising:
detecting, in the first vehicle, a second RF signal received from a second transmitting element located inside the first vehicle;
obtaining electrical energy from the first RF signal and the second RF signal; and
providing power to the device in the first vehicle based on the electrical energy obtained from the first RF signal and/or the second RF signal.

8. The method of claim 7, wherein the first transmitting element is a cellular transmitter system and the second transmitting element is a Wi-Fi device.

9. The method of claim 7, wherein the first RF signal comprises a band of cellular radio frequencies and the second RF signal comprises a band of Wi-Fi signal frequencies.

10. The method of claim 7, wherein obtaining electrical energy from the first RF signal and the second RF signal comprises:
identifying a first frequency band in a first wideband frequency spectrum of the first RF signal;
identifying a second frequency band in a second wideband frequency spectrum of the second RF signal;
selecting a first antenna in the first vehicle, the first antenna tuned to operate in the first frequency band;
selecting a second antenna in the first vehicle, the second antenna tuned to operate in the second frequency band; and
coupling an energy storage element to the first antenna and the second antenna for storing electrical energy in the first frequency band and/or the second frequency band.

11. The method of claim 6, further comprising:
determining a first signal strength of the first RF signal at a first location where the first vehicle is parked;
determining a second signal strength of the RF signal at a second location where the first vehicle is parked;
comparing the first signal strength to the second signal strength to determine a greater signal strength; and
parking the first vehicle in one of the first location or the second location based on the greater signal strength.

12. A vehicle comprising:
a first antenna configured to capture a first radio-frequency (RF) signal;
a second antenna configured to capture a second radio-frequency (RF) signal;
an energy storage element; and
an RF signal harvesting apparatus, comprising:
a memory that stores computer-executable instructions; and
a processor configured to access the memory and execute the computer-executable instructions to at least:
obtain a first amount of electrical energy from at least a portion of the first RF signal captured by the first antenna;
store the first amount of electrical energy in the energy storage element; and
provide, based on the stored first amount of electrical energy, power to a device from the energy storage element;
obtain a second amount of electrical energy from at least a portion of the second RF signal captured by the second antenna;
store, in the energy storage element, the second amount of electrical energy;
provide power to the device from the energy storage element and based on the stored first amount of electrical energy and the stored second amount of electrical energy; and
determine, based on an ambient RF energy map and a signal strength of the first RF signal at various parking spots, a parking spot for the vehicle.

13. The vehicle of claim 12, wherein the processor is further configured to access the memory and execute computer-executable instructions to:
identify one of a frequency component or a frequency band in the first RF signal; and
configure the first antenna to obtain the first amount of electrical energy from the one of the frequency component or the frequency band.

14. The vehicle of claim 12 wherein the first antenna is tuned to a cellular radio frequency and the second antenna is tuned to a Wi-Fi signal frequency.

15. The vehicle of claim 12 wherein the first RF signal comprises a band of cellular radio frequencies and the second RF signal comprises a band of Wi-Fi signal frequencies.

* * * * *